US006667713B2

(12) United States Patent
Green et al.

(10) Patent No.: US 6,667,713 B2
(45) Date of Patent: Dec. 23, 2003

(54) SELF-MONITORING SATELLITE SYSTEM

(75) Inventors: Gaylord B. Green, Los Gatos, CA (US); Samuel P. Pullen, San Mateo, CA (US)

(73) Assignee: Spectrum Astro, Gilbert, AZ (US)

( * ) Notice: Subject to any disclaimer, the term of this patent is extended or adjusted under 35 U.S.C. 154(b) by 50 days.

(21) Appl. No.: 09/938,983

(22) Filed: Aug. 24, 2001

(65) Prior Publication Data

US 2003/0040852 A1 Feb. 27, 2003

(51) Int. Cl.[7] .............................. G01S 5/14; H04B 7/185
(52) U.S. Cl. ................................... 342/357.02; 342/358
(58) Field of Search ........................... 342/352, 357.02, 342/368, 372, 377, 173, 174, 358; 701/29, 31, 13; 455/9, 67.4, 67.5, 67.7, 115.1; 340/539; 714/49, 18

(56) References Cited

U.S. PATENT DOCUMENTS

| | | | | |
|---|---|---|---|---|
| 4,445,118 A | * | 4/1984 | Taylor et al. | 342/357.09 |
| 5,294,934 A | * | 3/1994 | Matsumoto | 342/173 |
| 5,412,414 A | * | 5/1995 | Ast et al. | 342/174 |
| 5,530,449 A | * | 6/1996 | Wachs et al. | 342/174 |
| 5,623,414 A | | 4/1997 | Misra | 701/213 |
| 5,633,799 A | | 5/1997 | Dussell | 701/213 |
| 5,659,615 A | | 8/1997 | Dillon | 380/21 |
| 5,825,326 A | | 10/1998 | Semler et al. | 342/352 |
| 5,867,123 A | * | 2/1999 | Geyh et al. | 342/372 |
| 5,903,236 A | | 5/1999 | Lawrence | 701/214 |
| 5,986,575 A | | 11/1999 | Jones et al. | 340/906 |
| 6,091,357 A | | 7/2000 | Lazara et al. | 342/357.03 |
| 6,133,873 A | | 10/2000 | Krasner | 342/357.12 |
| 6,166,683 A | | 12/2000 | Hwang | 342/357.04 |
| 6,169,957 B1 | | 1/2001 | Arethens | 701/213 |
| 6,191,729 B1 | | 2/2001 | Arethens | 342/357.02 |
| 6,204,806 B1 | | 3/2001 | Hoech | 342/357.02 |
| 6,205,377 B1 | | 3/2001 | Lupash et al. | 701/13 |
| 6,211,822 B1 | | 4/2001 | Dougherty et al. | 342/357.12 |

OTHER PUBLICATIONS

Anana, M.P., et al. "Global Positioning System (GPS) Autonomous Navigation," IEEE Position, Location, and Navigation symposium 1990—The 1990's A Decade of Excellence in the Naviation Sciences, Mar. 1990, pp. 497–508.*

Kinal, George et al, "INMARSAT Integrity Channels for Global Navigation Satellite Systems", National Telesystems Conf. May 1992, pp3/5–3/8.*

Dr. Young C. Lee, "Receiver Autonomous Integrity Monitoring (RAIM) Capability for Sole–Means GPS Navigation in the Oceanic Phase of Flight", The Mitre Corporation, Jan. 1, 1992, pp. 464–472.

* cited by examiner

Primary Examiner—Greogory C. Issing
(74) Attorney, Agent, or Firm—Schmeiser, Olsen & Watts LLP

(57) ABSTRACT

A self-monitoring satellite system is disclosed to more quickly and accurately convey satellite signal information and verification of its reliability to users of the signal. In a first aspect, the satellite includes one or more receivers on the satellite to monitor the reliability of signals transmitted from the satellite. In a second aspect, a warning signal is generated and transmitted substantially simultaneous with an unreliable satellite signal and at the same frequency as the satellite signal. Exemplary embodiments to implement the various aspects of the self-monitoring satellite system invention are configured as global positioning system (GPS) satellites, signals, and receivers.

37 Claims, 8 Drawing Sheets (Conventional GPS Orbits)

SELF-MONITORING SATELLITE SYSTEM

BACKGROUND OF THE INVENTION

1. Technical Field

This invention generally relates to a self monitoring satellite system and more specifically to a satellite having an on-board receiver and monitoring processor for observing and evaluating a signal sent from the satellite to determine the reliability of the signal. The invention also relates to providing a warning signal to indicate that particular satellite signals may be unreliable and to transmitting these warning signals at multiple frequencies to assist users in compensating for signal interference and ionospheric delays.

2. Background Art

The Global Positioning System (GPS) is a space-based radio positioning network designed to provide users who are equipped with a suitable receiver with position, velocity, and time (PVT) information. Developed by the United States Department of Defense (DOD), the space-based segment of GPS comprises a constellation of satellites in inclined 12-hour orbits around the earth.

FIG. 1 shows an exemplary constellation 100 of GPS satellites 101 in orbit around the earth. The GPS satellites 101 are nominally located in six orbital planes 102 with four GPS satellites 101 in each plane plus a number of "on orbit" spare satellites (not shown) for redundancy. The orbital planes 102 of the GPS satellites 101 conventionally have an inclination of 55 degrees relative to the equator and an altitude of approximately 20,200 km (10,900 miles); each satellite completes one orbit in approximately 12 hours. This configuration positions the GPS satellites 101 so that a minimum of five of the GPS satellites 101 are normally observable (above the horizon) by a user anywhere on earth at any given time.

GPS provides PVT information based upon a concept referred to as time-of-arrival (TAO) ranging. The orbiting GPS satellites 101 each broadcast spread-spectrum microwave signals encoded with positioning data. The signals are conventionally broadcast at a number of known frequencies; for example, L1 at 1575.42 MHz, L2 at 1227.60 MHz, and (in the near future) L5 at 1176 MHz, with satellite ephemeris (satellite orbit data that allows its position to be computed in an earth-centered, earth-fixed, coordinate system) clock correction, and other data modulated using bi-phase shift keying, pseudo-random noise, or other techniques. Essentially, the signals are broadcast at precisely known times and at precisely known intervals. The signals are encoded with their precise times of transmission. A user receives the signals with a GPS receiver, which is designed to time the signals and to demodulate the satellite orbit data contained in the signals. Using the clock-correction data, the GPS receiver on earth determines the time between transmission by the satellite and reception by the receiver. Multiplying this amount by the speed of light gives what is termed the pseudorange measurement for that satellite.

If the GPS receiver clock were perfect, this would be the range measurement for that satellite from which the receiver could calculate its own PVT information. However, the imperfection of the clock causes the received measurement to differ from the satellite data by the time offset between actual time and receiver time. Thus, the measurement is called a pseudorange rather than a range. The time offset is common to the pseudorange measurements of all the satellites tracked by that receiver. By determining the pseudoranges of four or more satellites, the GPS receiver is able to determine its location in three dimensions, as well as the time offset. Thus, a user equipped with a proper GPS receiver is able to determine his PVT with great accuracy and to use this information to safely and accurately navigate from point to point, among other uses.

The accuracy of a user's PVT is of varying importance to different classes of users. For example, a pilot of an airplane flying high over the ocean may not be particularly concerned to learn that the location calculated for the airplane from the GPS signal at a given time is off by 300 meters because that magnitude of error is not a safety concern to the airplane at that location. Contrarily, a fighter jet landing on an aircraft carrier or a passenger plane landing on a runway must have measurements accurate to within less than a meter, or the results may be fatal. Nevertheless, with conventional GPS systems, the same GPS signals are sent to all users. To address the need to have highly accurate, reliable GPS satellite signals, GPS signals are continuously measured by ground monitoring stations located on the earth. Each ground monitoring station includes a receiver which receives the satellite signal and evaluates it independently and in comparison with other satellite signals to determine the reliability of the satellite signal. Two examples of ground monitoring station types are Wide Area Augmentation Systems (WAAS) and Local Area Augmentation Systems (LAAS). The WAAS and LAAS stations each monitor multiple satellites and broadcast the signals from the satellites to users. If the Air Force, for example, is notified by the GPS ground monitoring stations that the satellite signal is unreliable, the GPS Operational Control Segment (OCS) transmits a signal back to the satellite to stop the satellite from transmitting unreliable signals until the satellite may be relied upon again. This takes a minimum of minutes and more typically hours to take this action. The OCS also may instruct the satellite to transmit a warning signal to users to indicate that the satellite's signal is unreliable.

Signal reliability may be affected by any number of factors such as failure or space radiation upset within the satellite circuitry, inaccurate positioning data from the satellite, signal distortion, signal power level, atmospheric interference, timing errors, and the like. With the WAAS and LAAS ground stations monitoring the reliability of the satellite signals, however, loss of signal continuity and, thus, loss of a reliable signal may have one of two primary causes: 1) a detected or obvious failure (loss of signal) of one or more satellite signal measurements; and 2) a false alarm issued by an integrity monitor at the ground station, causing incorrect exclusion of one or more measurements. When a false alarm occurs, the ground station does not know where the error has occurred; namely, whether the error was caused within the satellite circuitry, signal interference between the satellite and the ground station, or within the ground station itself. Thus, the satellite signal may not be unreliable, but users are denied access to the satellite signal because the ground station has identified the signal as unreliable. For situations where the satellite signal is not safety critical, this extreme measure may not have been necessary. Loss of signal continuity in safety critical applications, such as civil aviation, for example, requires a civil aviator to abort its operation(s) after checking that the service which was predicted to be available at the start of the operation(s) is no longer available.

Additionally, for users of GPS signals in situations where the accuracy of the user's PVT is a safety concern, the reliability of the satellite signal must be checked regularly. Using current technologies, it takes a minimum of 10 to 16 seconds to receive a confirmation of the reliability of a satellite signal. This is because when there is an error within the GPS system, the PVT information which is sent from the satellite must be checked at the ground monitoring station, and a signal must be sent back to a non-GPS satellite or other communication medium indicating that there is an anomaly. In safety-critical situations, where a delay of even 3 seconds may be fatal, the presently achievable minimum of 16 seconds is unacceptable.

As a result of this delay, other technologies have been developed in an attempt to provide more accurate, quicker responses for GPS signal reliability confirmation. One particular example is an Integrity Beacon Landing System (IBLS), such as that disclosed in U.S. Pat. No. 5,903,236 to Lawrence (May 11, 1999) which includes a pair of landing beacons located adjacent an airplane runway to create a reference "bubble" around a section of airspace to quickly orient an airplane to the correct PVT information required for that runway. Systems such as these, however, still maintain inherent delays and inaccuracies, and require additional hardware to be installed at each local site.

Thus, there is a need for a GPS satellite system which can quickly and accurately verify the reliability of each satellite signal and which can provide a GPS signal to users with very high continuity in addition to reliability.

DISCLOSURE OF THE INVENTION

The present invention relates to a self-monitoring satellite system configured to quickly and accurately convey satellite signal information and verification of its reliability to a user of the signal. Primarily, two aspects of the invention are described herein. First, to quickly verify the reliability of a satellite signal transmitted from a satellite, a receiver for monitoring the signal is included on the satellite. The receiver may receive signals transmitted from the satellite to which it is attached and perform any number of reliability tests on the signal to ensure its integrity. As used herein, the meanings of the terms "integrity" and "reliability" are intended to be interchangeable and are intended as an indication of whether a signal is trustworthy, meaning it is not corrupted or misleading. Second, to quickly warn users of an unreliable satellite signal, a warning signal is transmitted to users substantially simultaneous with the satellite signal. When reliability testing of a satellite signal is completed, an indication that the signal is unreliable may be sent on the same frequency as the initial satellite signal. Therefore, the time lag between the delivery of the satellite signal and the confirmation of its reliability is dependent only upon the update rate and response time of the signal tests.

An embodiment of the invention is configured as a GPS receiver that normally provides position, velocity, and time (PVT) information to a user. To check the reliability of the transmitted PVT information, it is received and monitored at a receiver on the satellite transmitting the signal. A plurality of tests are performed on the satellite signal and PVT information contained therein to ensure its reliability or integrity. If the signal is unreliable, a warning signal is sent as part of the next update of the satellite signal. Users of the PVT information, therefore, can reject a satellite's unreliable signal or at a minimum consider the warning in deciding whether or not to rely upon the signal. The GPS satellite signals, and any warning signals sent simultaneous therewith, are simultaneously transmitted at each of three different frequencies. A receiver configured to receive the signals separately evaluates each of the three frequencies, calculates and compensates for any interference or ionospheric delay experienced by the satellite signal, and separates the various components of the signal. Using this and other satellite signals, a receiver may calculate the PVT information for the user and display any appropriate warnings regarding the reliability of the calculation made.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
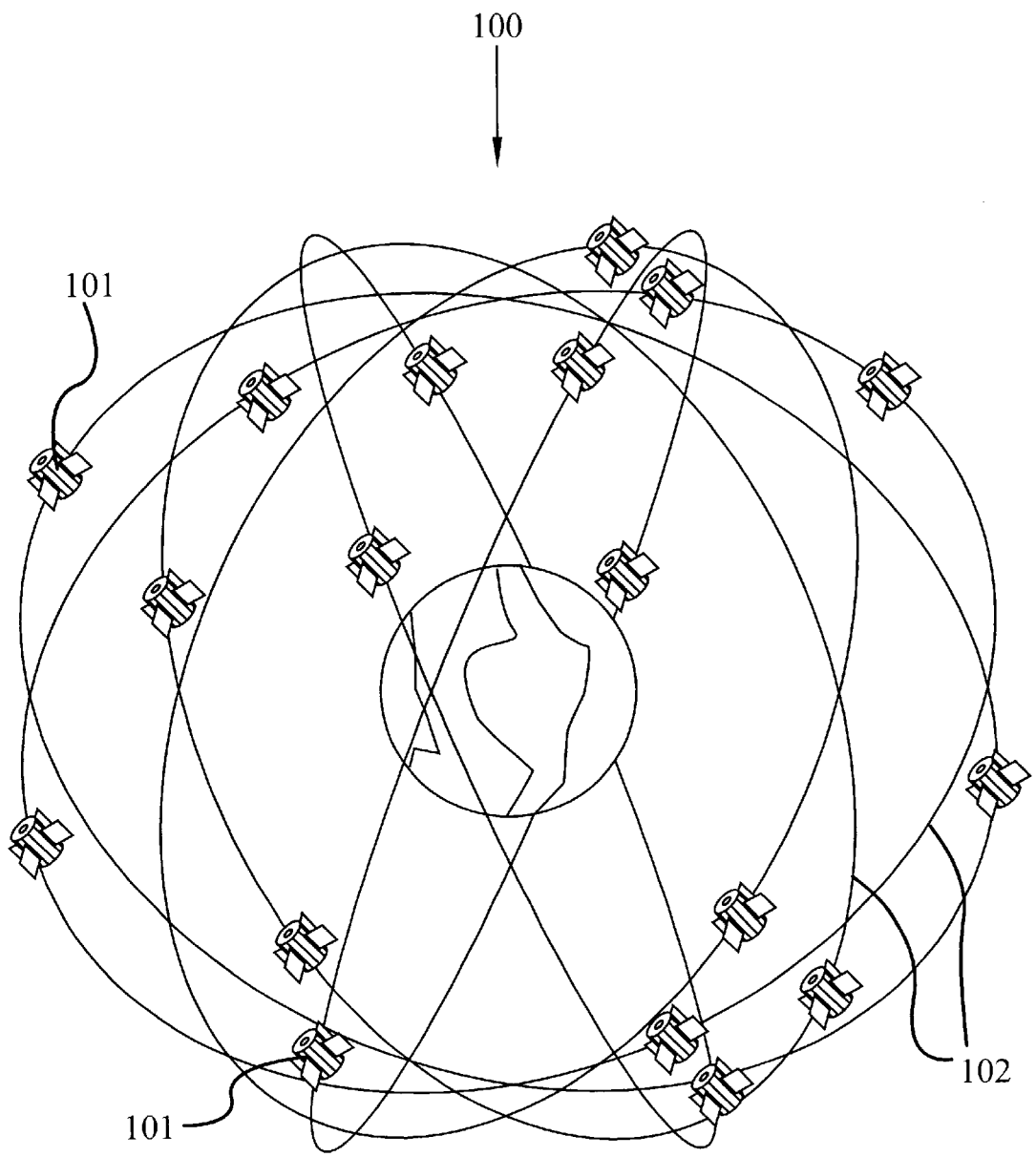
FIG. 1 is a diagram of conventional GPS satellite orbits.
Figure 2:
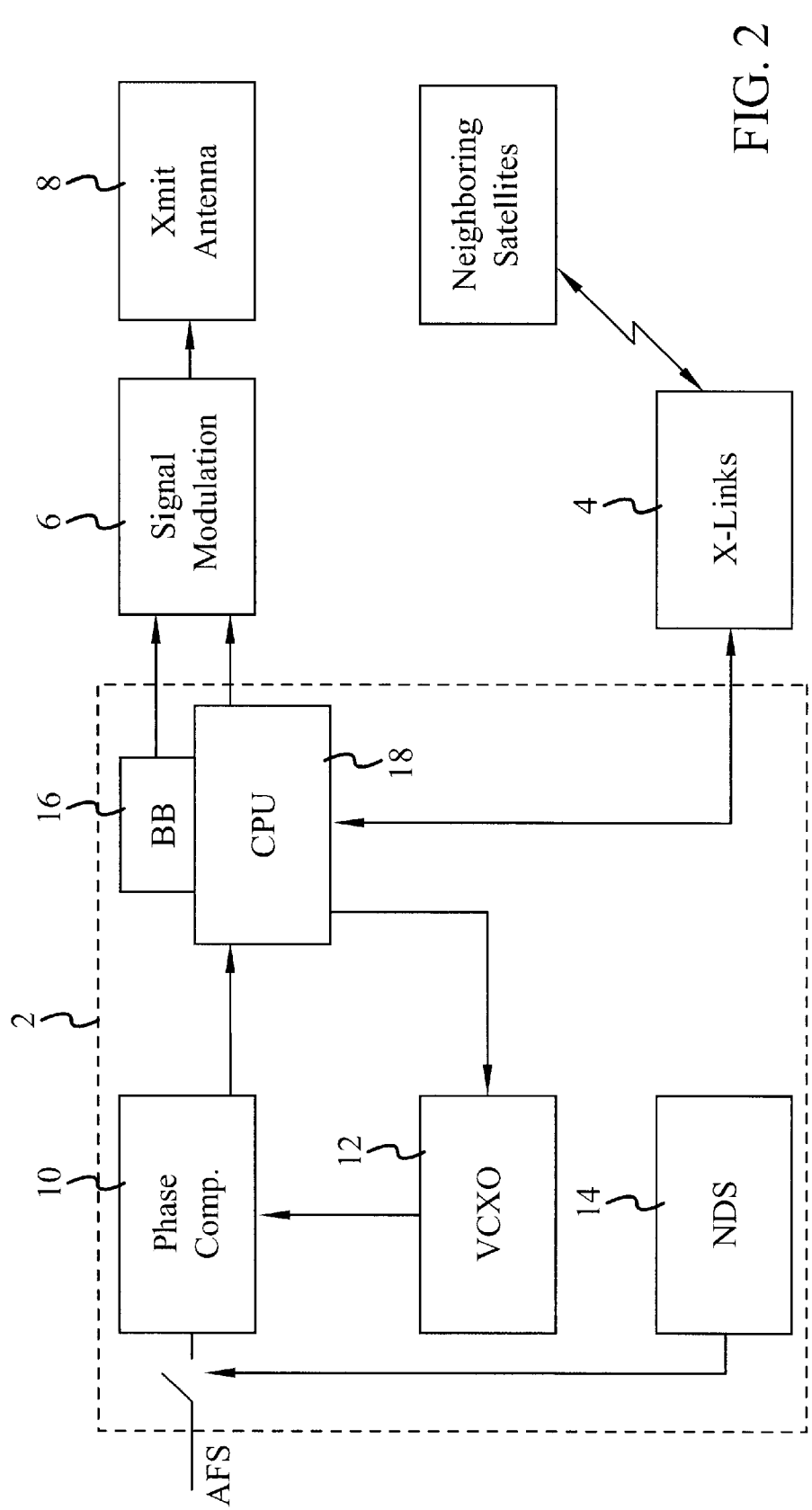
FIG. 2 is a block diagram of conventional navigation satellite circuitry.

As discussed above, embodiments of the present invention relate to a self-monitoring satellite system with a receiver and monitor for determining the integrity of signals transmitted from the satellite and then providing a warning signal to users if the satellite's signal integrity is deemed unreliable. FIG. 2 illustrates a signal processing center 2 for a conventional navigation satellite. The signal processing center 2 permits the satellite to receive information, such as relative position, velocity and time (PVT) information, from neighboring satellites through cross-links 4 established between the satellite and neighboring satellites. Cross-link technologies are well known in the satellite art. Two examples of cross-link technology are shown and described in U.S. Pat. No. 5,971,324 to Williams et al. (Oct. 26, 1999), and U.S. Pat. No. 6,125,261 to Anselmo et al. (Sep. 26, 2000), the disclosures of which are hereby incorporated herein by reference.

As shown in the block diagram of FIG. 2, conventional navigation satellite technologies also include a signal processor 6 and a transmission antenna 8 to transmit information from the satellite to a ground station or other satellite signal user. An atomic frequency standard ("AFS") is used to maintain a satellite clock time nearly identical to the master time for all of the satellites in a constellation. If each satellite's time (including the clock corrections in the navigation data) is not maintained close to the common master time, there may be significant errors in user PVT solutions. The AFS drives the carrier frequency generator BB ("base band") 16 at GPS frequencies and through countdown circuits for GPS code generators NDS 14 at lesser frequencies. After comparing the phases 10 of the AFS and local signals, the CPU modulates the GPS codes, which include the GPS navigation data, onto the carrier at each of the transmitted frequencies. The cross-links may be used to keep the AFS synchronized to the master time of the constellation.

One of the difficulties inherent in the use of satellites used for safety-critical applications is to ensure user integrity in the face of possible failures in the satellite signals. Ground-based satellite-operator solutions to this problem are complex and costly and have difficulty meeting the Federal Aviation Administration failure alerting requirements. Models for possible satellite failures have been developed but are imperfect because of the limited statistical information available to the satellite operators and to the civil user community. As a result, it is difficult to validate the single-failure assumption made by Receiver Autonomous Integrity Monitoring (RAIM) or to certify that Space Based Augmentation Systems (SBAS) and Ground Based Augmentation Systems (GBAS), such as a LAAS station or a WAAS station, safely detect all threatening satellite failures. In addition, when satellite failures occur, they must be detected and sorted out from an array of possible failures on SBAS and/or GBAS systems or else the continuity of the satellite signal will be sacrificed unnecessarily due to false alarms. These difficulties would be greatly lessened in future satellite systems if integrity monitoring were conducted on-board the satellite itself so that immediate warnings could be transmitted to users.

According to a first aspect of the invention, a satellite may be configured to receive and monitor satellite signals transmitted from itself and evaluate certain characteristics and properties of those satellite signals to determine the integrity of those signals. In this way, the satellite is configured as a self-monitoring satellite. By configuring a satellite to receive and monitor its own transmitted signals in real time, the satellite may more quickly determine the integrity of the transmitted signals and may better evaluate whether any errors detected by a ground station are caused by the satellite or by another source. Additionally, by including the hardware and software necessary for a satellite to monitor itself, the processing load and GPS signal integrity detection experienced by conventional SBAS, GBAS, or other ground-based system, which must monitor the signals from 12 or more satellites simultaneously, may be significantly improved to an extent that in time it may be reduced to monitoring only local non-GPS signal-in-space issues.

Figure 3:
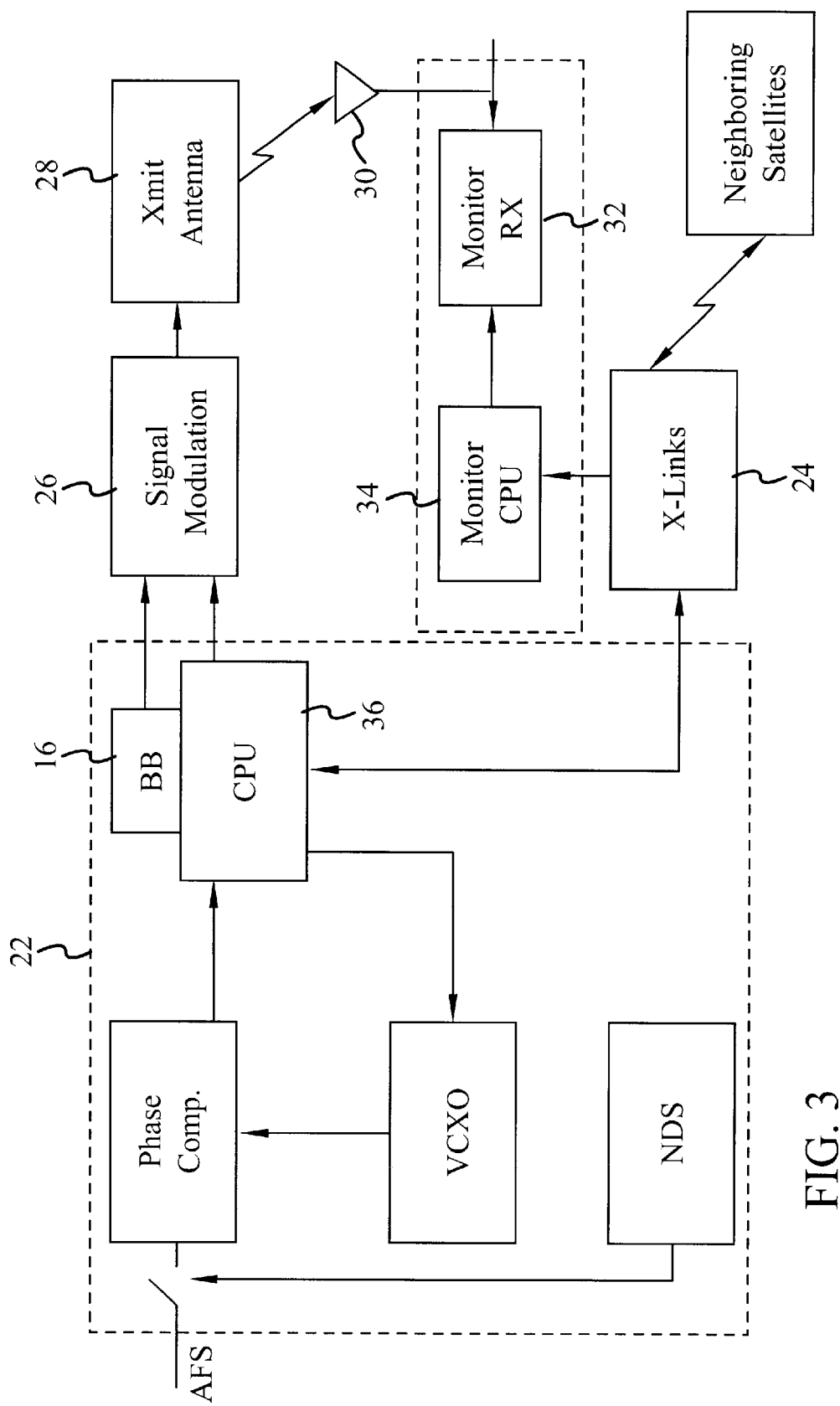
FIG. 3 is a block diagram of navigation satellite circuitry configured according to an embodiment of the present invention.

As illustrated in FIG. 3, embodiments of a satellite configured according to the present invention, like conventional GPS satellites, include a signal processing center 22, signal modulating circuitry 26, and a transmission antenna 28. However, embodiments of the present invention also include a receiver antenna 30 coupled to a satellite signal monitoring receiver 32 and a satellite signal monitoring processor 34. The receiver antenna 30 and the satellite signal monitoring receiver 32 may be configured similar to any satellite signal receiver and antenna having the functions necessary to monitor the integrity of a satellite signal, such as those employed in a conventional SBAS, GBAS, or other satellite signal integrity monitoring system. For longer-term clock state and dynamics monitoring (greater than 15 minutes), cross-links 24 to neighboring satellites are used. Such systems routinely evaluate the characteristics and properties of the signals for a particular satellite application and are well known to those of ordinary skill in the art.

Figure 4:
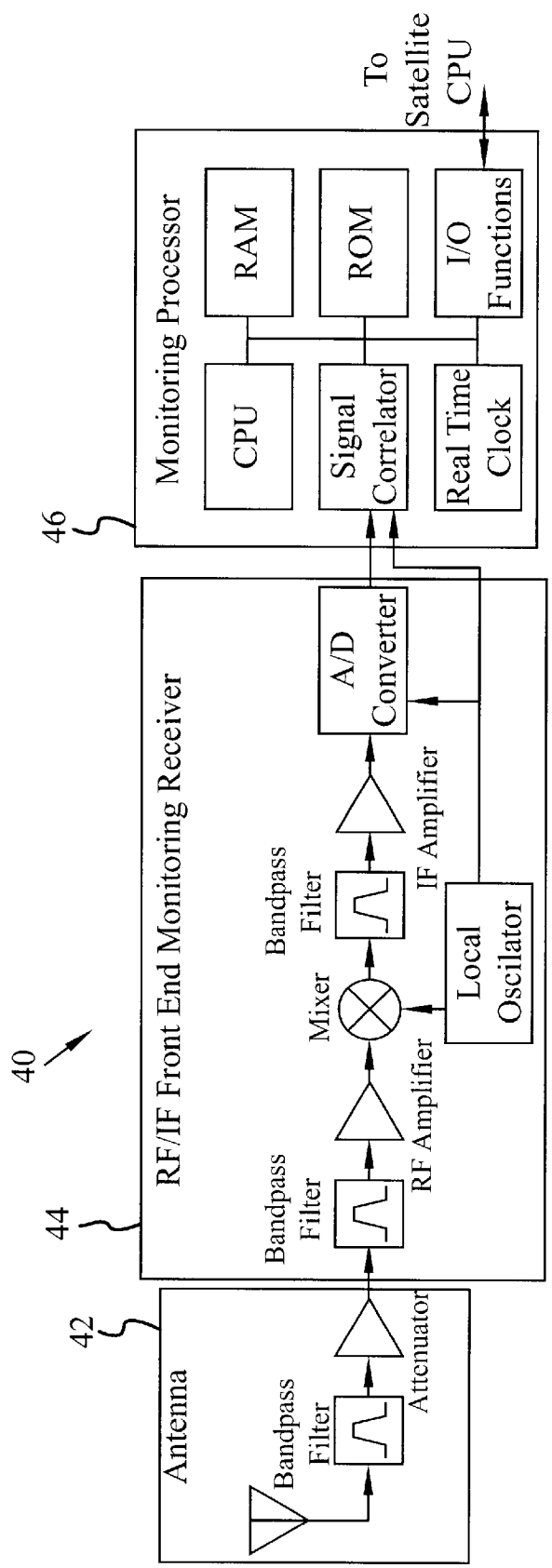
FIG. 4 is a block diagram of a GPS Receiver, such as that shown in FIG. 3, configured according to an embodiment of the present invention.

FIG. 4 provides one particular example of a receiver circuit 40 which may be added to a conventional satellite system to provide the advantages of the self-monitoring aspect of the embodiments of the present invention. The receiver circuit 40 of FIG. 4 includes an antenna 42, with an optional bandpass filter and a preamplifier or an attenuator depending upon the satellite signal strength, a radio-frequency and intermediate-frequency (RF/IF) "Front End" section 44, and a monitoring processor 46 that controls the receiver 40, processes the received signals, and performs the necessary calculations from the received signal data. The receiver 40 may also include a power supply and additional memory devices for storing instructions and data.

When a satellite signal arrives at the receiver 40, the antenna 42 receives the signal and may filter any noise associated with the received signal. The RF/IF Front End circuit 44 thereafter removes the carrier signal and further demodulates and processes the satellite signals, converting them to digital signals for use by the monitoring processor 46. The RF/IF Front End circuit 44 serves to translate the frequency of the received satellite signals to a lower frequency, called an intermediate frequency (IF), which is more easily managed by the rest of the receiver. A local oscillator performs this task by combining the incoming RF signal with a pure sinusoidal signal. In a receiver configured as a GPS receiver, the sinusoidal signal is conventionally generated using a precision quartz crystal oscillator. Optionally, the local oscillator signal may be obtained from an external source such as an atomic frequency standard (rubidium vapor, cesium beam, or hydrogen maser), which has a higher frequency stability. Receivers supplied with such a signal can produce carrier-phase measurements with less clock noise.

The IF signal contains all of the modulation that is present in the transmitted signal; only the carrier has been shifted in frequency. The shifted carrier's frequency is simply the difference between the original received carrier frequency and that of the local oscillator. Some receivers employ multiple IF stages, reducing the carrier frequency in steps. Filters are used at each IF stage to suppress out-of-band interference and other undesired signals. The amount and types of preamplification and filtering required in the antenna 42 and the RF/IF Front End circuit 44 are dependent upon the anticipated received signal characteristics and environment of the satellite. The example of FIG. 4 is provided as one example of a receiver system. One of ordinary skill in the art will be able to readily design the particular filtering needed for any given application.

The monitoring processor 46 may include whatever components are necessary for the particular application the satellite signal receiver is intended to fulfill, and may, for example, include such components as a signal correlator, a processor (CPU), data storage devices (RAM, ROM), a local clock, and an input/output signal function generator. The monitoring processor 46 may also be combined with additional processors, receivers, data storage devices, processing systems, and other hardware and software as required to increase the functionality of the system. In the receiver, the final IF signal from the RF/IF Front End circuit 44 may be passed to a signal tracker or signal correlator in the monitoring processor 46. The omnidirectional antenna used in embodiments of the present invention receives only the transmitted signal from the satellite upon which the receiver is mounted because that signal is significantly stronger than the signal of any other satellite. The antenna uses the hardware from a conventional receiver, including a plurality of signal channels to track multiple satellites and to track different aspects of the signals from the satellite on which it is mounted. By comparing these different channels using a plurality of integrity algorithms, the integrity of the satellite's transmitted signal may be monitored. Because each satellite signal includes a code portion unique to the transmitting satellite, discrimination between the different satellite signals is a matter of course, and a satellite may readily be configured to distinguish its own signal from those of other satellites. According to one embodiment of the invention, multiple receivers each having a plurality of channels are used to track different aspects of signals transmitted from the satellite on which the receivers are located. One specific example of a receiver which may be programmed to operate according to embodiments of the present invention is the OEM-4 receiver board manufactured by NovAtel of Calgary, Alberta, Canada.

Figure 5:
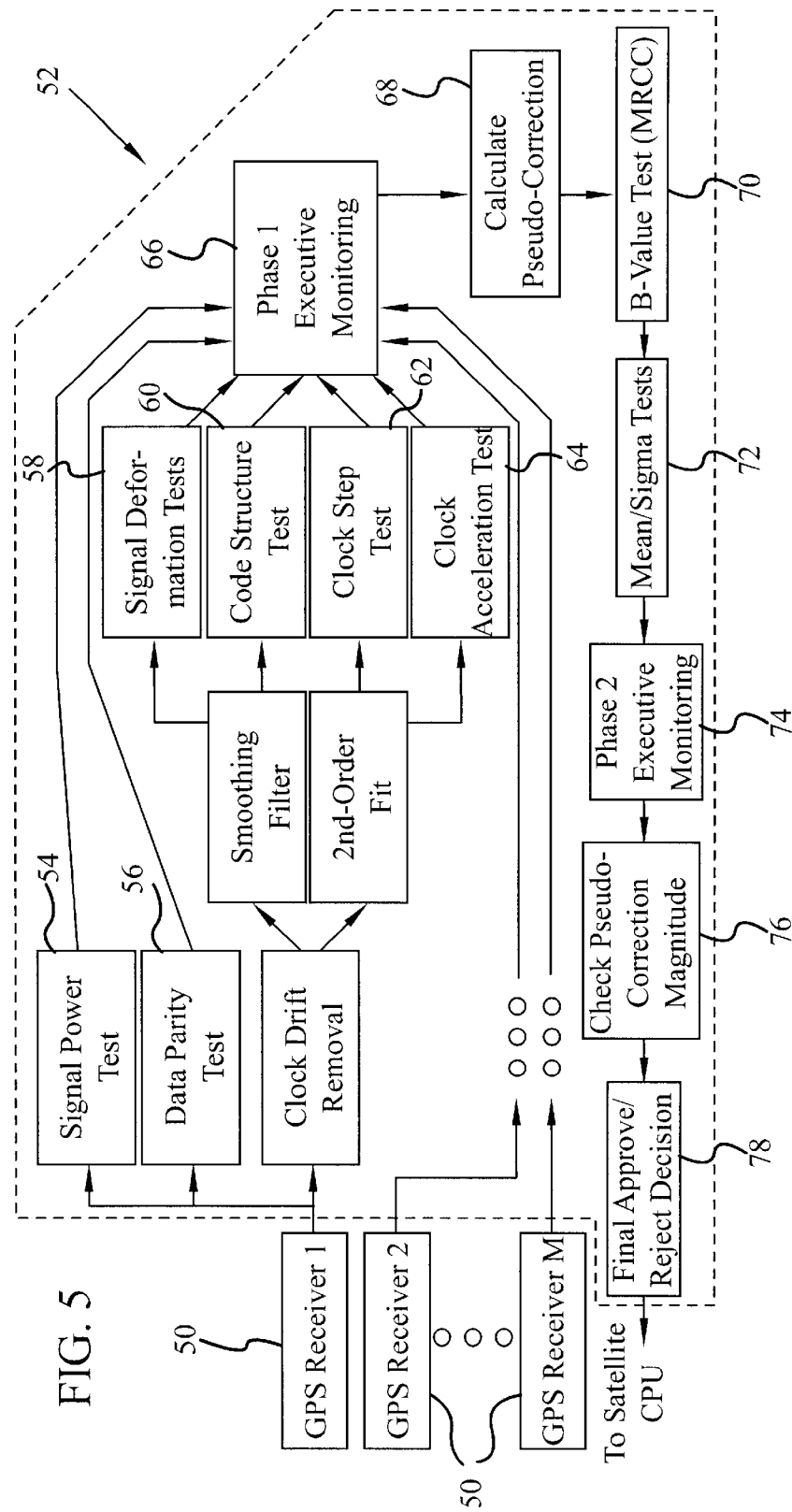
FIG. 5 is a block diagram of a Monitor CPU, such as that shown in FIG. 3, configured according to an embodiment of the present invention.

In an embodiment of the invention shown in FIG. 5, the receiver circuit 40 of FIG. 4 is configured as a GPS receiver and is used as one of a plurality of GPS receivers 50 to receive and initially process satellite signals for a monitoring processor 52. In this case, the GPS receivers 50 (one each for channels 1-M) partially process the received satellite signals to produce the measurements necessary for testing and evaluation of the received satellite signals in the monitoring processor 52. In one specific embodiment, the output of the GPS receivers is configured to provide the received signal code shape, the signal power, and the phase acceleration to the monitoring processor 52 through various channels of the GPS receivers 50. Alternatively, the processing portions of the GPS receivers 50 and the processing portions of the monitoring processor 52 may be combined into a single processor circuit. The monitoring processor 52 evaluates the received satellite signal through a number of tests to determine the integrity of the transmitted signals, and then transmits its own signal to the main satellite signal processing center 22 (FIG. 3) to indicate whether the received signal is of high integrity. The monitoring processor 52 may also further filter the data it receives to reduce the effect of noise or to obtain more reliable PVT information. In some embodiments of the invention, the signal may even indicate to what degree the signal's integrity is unreliable, or for how long or in what way the integrity of the satellite signal has been unreliable.

Although any number of satellite signal integrity tests are possible depending upon the type of satellite signal being tested and the purpose of the signal, for the specific embodiment of the invention configured to evaluate GPS signals in the embodiment shown in FIG. 5, a number of appropriate signal tests are performed. First, a signal power test 54 may be performed to directly determine whether the power of the transmitted signal is sufficient for the purpose it is intended, namely to transmit with sufficient quality to any GPS user. Second, a data signal parity test 56 may be performed to ensure the proper GPS data is correctly transmitted in the GPS signal. Third, a signal deformation test 58 may be performed to ensure that the GPS signal phase is not distorted as it is modulated onto the carrier. A distorted GPS signal phase would cause an erroneous correlation by a GPS user. Fourth, a code structure test 60 may be performed to ensure that the code is the correct code, that it transitions the carrier properly, and that no divergence results. Improper carrier transition or divergence would cause a user to misinterpret the GPS signal. Fifth, a clock step test 62 may be performed to detect any AFS or GPS clock jumps which may cause the GPS user to have a safety-threatening position error. Sixth, a clock acceleration test 64 may be performed to ensure that any AFS or GPS clock rapid accelerations do not occur which may impact GPS user safety. Additionally, the totality of the tests monitor that the radiation in space has not caused a single event upset in any of the digital electronics, which may cause a safety-threatening problem to any GPS user.

The GPS satellite signals are monitored redundantly with multiple processing algorithms to detect potential signal integrity violations. If a satellite integrity problem is detected by a single channel (1-M), it will not be clear if the error is in the satellite or in the on-board GPS receiver 50 associated with that channel (1-M). Therefore, multiple receiver channels (1-M) are used and vote on whether the transmitted signal is erroneous. This may be accomplished by different receivers 50 monitoring different frequencies and comparing any differences and different receivers 50 monitoring exactly the same signal to evaluate differences. The initial comparison of the test results and voting on signal integrity occurs in the Phase 1 Executive Monitoring circuitry 66. A simple, exemplary algorithm for voting between the channels may be that if two out of three receivers monitoring the same signal indicate an integrity problem, an integrity warning would be transmitted. Other, more complex algorithms will also work and may be readily determined by one of ordinary skill in the art. Many algorithms also exist and may be incorporated into the Phase 1 Executive Monitoring circuitry 66 or elsewhere on the satellite to ensure that any GPS user notification of a detected integrity problem is not a false alarm.

Once an initial determination of signal integrity is made, other tests and corrections to signal integrity may be performed. These tests may include tests such as calculating a pseudo-correction 68, performing a B-Test (MRCC) 70, performing Mean/Sigma Tests 72, performing other Executive Monitoring 74, and checking the pseudo-correction magnitude 76. These and other tests used to verify the veracity and integrity of satellite signals are known to those of ordinary skill in the art. Once all desired tests and corrections have been made on the signal to verify or correct its integrity, a final decision to approve or reject the transmitted satellite signal is made in the Final Approve/Reject Decision circuitry 78. If the voting and other tests did not reveal any integrity concerns, a confirmation of validity may be sent to the satellite CPU 36 (FIG. 3). If, however, the final decision was that the signal should be rejected for integrity reasons, an appropriate signal would be sent to the satellite CPU 36 (FIG. 3). This final decision signal may include merely a pass/fail indication, or may, in some embodiments, include an indication of the magnitude or precise nature of the anomaly causing the integrity breach.

Once the desired characteristics and properties of a satellite's signals have been evaluated by the on-board monitoring system, an indication that the signal is reliable or unreliable may be sent by the satellite. In a conventional satellite signal integrity monitoring system for a GPS satellite, when a satellite signal is identified by a GBAS or SBAS as being unreliable to any degree, a warning signal is sent by the monitoring system to users by a separate means of communication rather than by the satellite itself. With on-board monitoring, when any significant signal integrity problem arises, the PVT signal may be caused to cease transmission or to set to an "unhealthy" or non-standard code so that all users are denied access to the use of the, and a repeating GPS satellite "1010101010 . . . " code may be sent. With an integrity problem that affects only a few GPS users, warning signals may be broadcast through a separate code or a code modulated on existing codes or through the GPS navigation data structure. Thus, regardless of the degree of unreliability, a code is sent at the warning frequency to indicate that the signal from that satellite is unreliable. If, for example, a satellite transmitted a signal which was determined by the integrity monitoring system to be 1 m off of the expected range value, the signal would be treated as unreliable to a limited number of GPS users and the modulated code or data notification would be used. If this error was greater by a factor of 100, a non-standard code (repeating "10101010") would be transmitted, or transmission would cease. For satellite signal users who are, for example, hiking on a mountain or sailing a ship in the middle of the ocean, minor errors on the order of 1 meter are not critical, and a GPS satellite signal with such minor errors could be reasonably relied upon.

According to a second aspect of the invention, if the integrity of a satellite signal is deemed unreliable, a satellite or an SBAS or GBAS relaying the satellite signal and/or corrections to the satellite signal may transmit a warning signal to users substantially simultaneous with an unreliable satellite signal to indicate that the satellite signal should not be used. Although the warning signal may be transmitted from any of a satellite, an SBAS, or a GBAS, in a first embodiment of the second aspect of the invention, a satellite is configured to transmit its own warning signal to users, which may include notification to SBAS or GBAS, in response to its own evaluation of the transmitted signal.

In embodiments of the invention, each satellite signal transmitted carries with it an indication of the reliability of the signal transmitted immediately previous to that signal. In this way, the indication of the integrity of a satellite signal is delayed only by the time required to test and update the signal. In tests of a system configured according to embodiments of the invention, the delay time for an indication of a reliable PVT signal transmission was less than 2 seconds and in some cases even as fast as 0.5 seconds. This is a significant improvement over the 16-second minimum achievable by previous systems. Thus, by transmitting a warning signal substantially simultaneous with the satellite data signal to which the warning corresponds, users may quickly determine on their own whether or not to rely on the signal in computing the specific PVT information for the user. In situations where the signal integrity is extremely compromised, however, the transmission of the satellite signal may still be ended or made untrackable to all GPS user receivers (so that no user could apply the signal in his PVT solution).

"PVT information" and "PVT data" are general terms that are intended to include C/A (or "Clear Acquisition") code and other codes (such as P/Y code, which is used by military users) and the navigation data encoded onto these codes. C/A and P/Y codes are tracked by each user to measure the user's pseudorange from each satellite whose signal the user can receive (the correlation process by which this is done is complex but is well-known in the GPS field). Thus, flaws in this C/A code are one of the primary integrity threats to users. The user applies the clock correction in the navigation data to adjust the user's measured transmission time for known imperfections in the AFS on each satellite (relative to GPS "master time"). The user then uses the locations of each satellite computed from the ephemeris parameters in the navigation data to solve for the user's position and the current time (the user's receiver time modified by the solution for the receiver's clock bias). Velocity may also be estimated from these measurements over time. Thus, when PVT information is received through a coded signal, which may also include ancillary data, a user estimates its pseudorange to the satellite from the nature of the coded signal rather than from any particular data within the signal. Using conventional GPS technologies, estimating user PVT only occurs after at least 4 satellites are tracked and used in a series of receiver calculations. However, the present invention is not limited to conventional GPS technologies, and may be applied to future technologies which estimate user PVT with fewer than 4 satellites from the disclosure provided herein.

In a second embodiment of the second aspect of the invention, the warning signal includes data to communicate not only an indication that the integrity of the satellite signal is unreliable, but also information about the nature of the anomaly such as, for example, what aspect of the signal is unreliable and to what degree the signal or a particular aspect appears to be in error. With better knowledge of the error detected in the satellite signal, a particular user or receiver of the satellite signal may make a more relevant determination of whether to rely upon the satellite signal in a particular situation. For example, if the satellite is transmitting an unreliable C/A code which appears to be off by 1 m, a hiker in the mountains may still access and generally rely upon the data provided, knowing it may not be completely accurate. A passenger plane landing a large plane on a runway, however, may decide not to rely upon the data provided and may abort the present landing operation. In either case, however, the satellite signal providing the PVT or other data is still available for various users and receivers to rely upon or reject in light of the warning provided.

Figure 6:
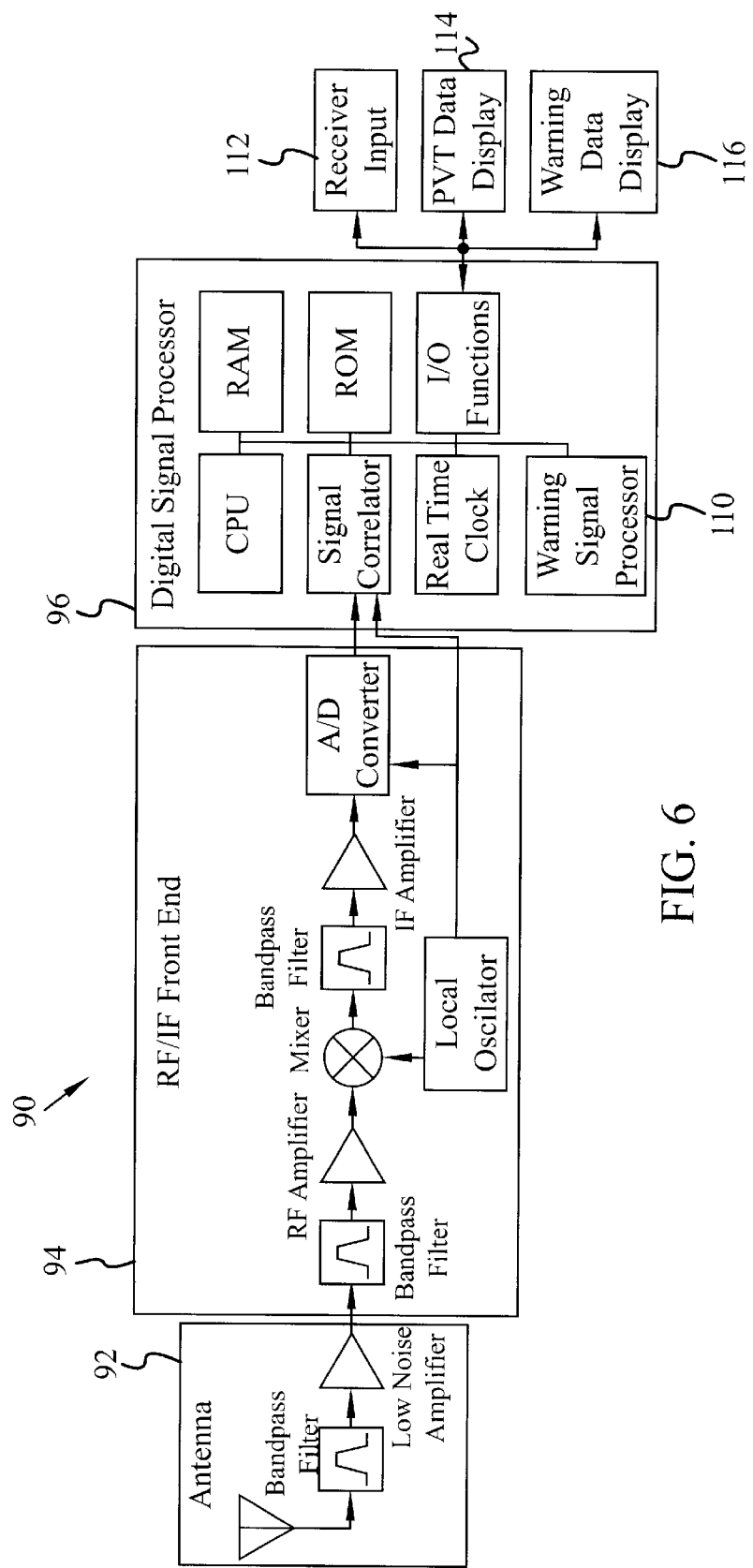
FIG. 6 is a block diagram of a GPS Receiver with a warning data display configured according to an embodiment of the present invention.

In accordance with this second aspect of the invention, in an embodiment of the invention, a satellite signal receiver is configured to simultaneously receive both the nominal PVT satellite signal and the warning signal, calculate PVT information for the receiver with combined reliance upon PVT information from other satellites, and display appropriate PVT information in response to the warning signal data. FIG. 6 illustrates one example of a GPS receiver 90 configured to receive both warning signals and PVT signals from a satellite (potentially including GBAS and/or SBAS signals), and display appropriate satellite measurements in response to the warning signal. Receiver 90 includes an antenna 92, an RF/IF front end 94, and a digital signal processor 96. The digital signal processor 96 includes a signal correlator 98 configured to separately evaluate the satellite PVT signals and the satellite warning signals for a plurality of satellite signals. The warning signal may be evaluated in a warning signal processor 110. The digital signal processor 96 may also be coupled to a receiver input 112, such as a keypad, touch screen, remote receiver, or other input device, a PVT data display 114, and a warning data display 116.

In a receiver, the final IF signal from the RF/IF front end 94 may be passed on to the signal correlator 98 in the digital signal processor 96. The omnidirectional antenna 92 used in embodiments of the present invention simultaneously intercepts signals from all satellites above the antenna's horizon. The receiver isolates the signals from each particular satellite and evaluate the specific characteristics and properties of each. Isolation is achieved by using a number of channels and assigning each signal to a particular channel. Because each satellite includes a unique code portion of its satellite signal, discrimination between the different satellite signals is a matter of course.

In operation, once the receiver 90 receives a combined satellite signal, which may be combined by modulating the PVT signal with the warning signal before modulating it with a carrier signal, the receiver 90 filters and separates the combined signal from other combined satellite signals. The receiver 90 also filters and separates the PVT signal from any warning signal for each satellite to enable the digital signal processor 96 to separately evaluate the signals. Warning signals may be transmitted by modulating any of the existing codes, creating a new code to be modulated onto the existing signals, or by adding the warning code to the transmitted GPS data. For example, the current GPS signal has a telemetry word which is transmitted in the code every 10 milliseconds. The GPS user's receiver can be configured to read the information in this telemetry word if that is used for the integrity notification. Once the receiver reads the integrity notification, it could ignore that satellite based on earlier user preferences without immediately notifying the user, or it could identify the error to the GPS user requesting guidance.

The warning data display 116 may be configured to display only an indication of unreliable signal integrity, such as a blinking LED, or may be configured to display more specific information regarding the nature of the unreliable signal integrity, such as the nature of the error detected, the extent of the resulting error, and the present duration of the unreliability. Additionally, the digital signal processor 96 may be configured to always display the PVT measurements on the PVT data display 114 regardless of the warning data, display the PVT data on the display 114 only when the severity of the error is below a threshold level, or stop display of the PVT data immediately when any signal integrity is unreliable. Alternatively, the receiver 90 may be configured to allow a user to select between various levels of signal integrity scrutiny based upon the particular application in which the user is relying upon the information stored in the PVT data. For example, a hiker may determine that positional errors of less than 50 meters, or velocity errors of less than 5 kph are unimportant and select the appropriate level of signal integrity scrutiny. Alternatively, a fighter jet pilot may determine that even 3 m of positional error or 1 kph of velocity error is a safety risk and select a level of signal integrity scrutiny which will not display or rely upon any satellite signal with an integrity warning. While FIG. 6 and the related discussion illustrates an example of a satellite signal receiver configured as a GPS receiver, it should be understood that any satellite signal receiver may be configured to simultaneously receive a warning signal with another satellite signal and display an appropriate data in response to the warning signal.

Additionally, by employing the self-monitoring satellite aspect of the present invention, the reliability of the satellite signal at the time it is transmitted from the satellite may be verified. Thus, the inaccuracy of the PVT data may be bounded for each individual satellite rather than merely for the entire system. Furthermore, because the reliability of each individual satellite may be bounded, a satellite signal receiver employed in a system configured according to embodiments of the present invention may more reliably display the PVT solution from the receiver without the need of a GBAS or SBAS to check the reliability of the signal. Current algorithms in receivers have difficulty in conventional receiver autonomous integrity monitoring systems because the cause and isolation of the error is uncertain. If, however, the receiver knows that the satellite is not in error and that any inaccuracy it will produce is bounded, the algorithms can better identify local interference and multipath problems which can also cause loss of GPS user integrity. For example, by measuring the divergence between the code and the carrier, multipath errors may be identified. However, in certain circumstances where a higher degree of accuracy is desired and a GBAS or SBAS is available (such as a Category III aircraft precision approach, in which the aircraft must safely navigate to within 50 feet of the ground under zero-visibility conditions), differential corrections and additional monitoring through a GBAS or SBAS may be desired to further reduce errors and enhance integrity.

Figure 7:
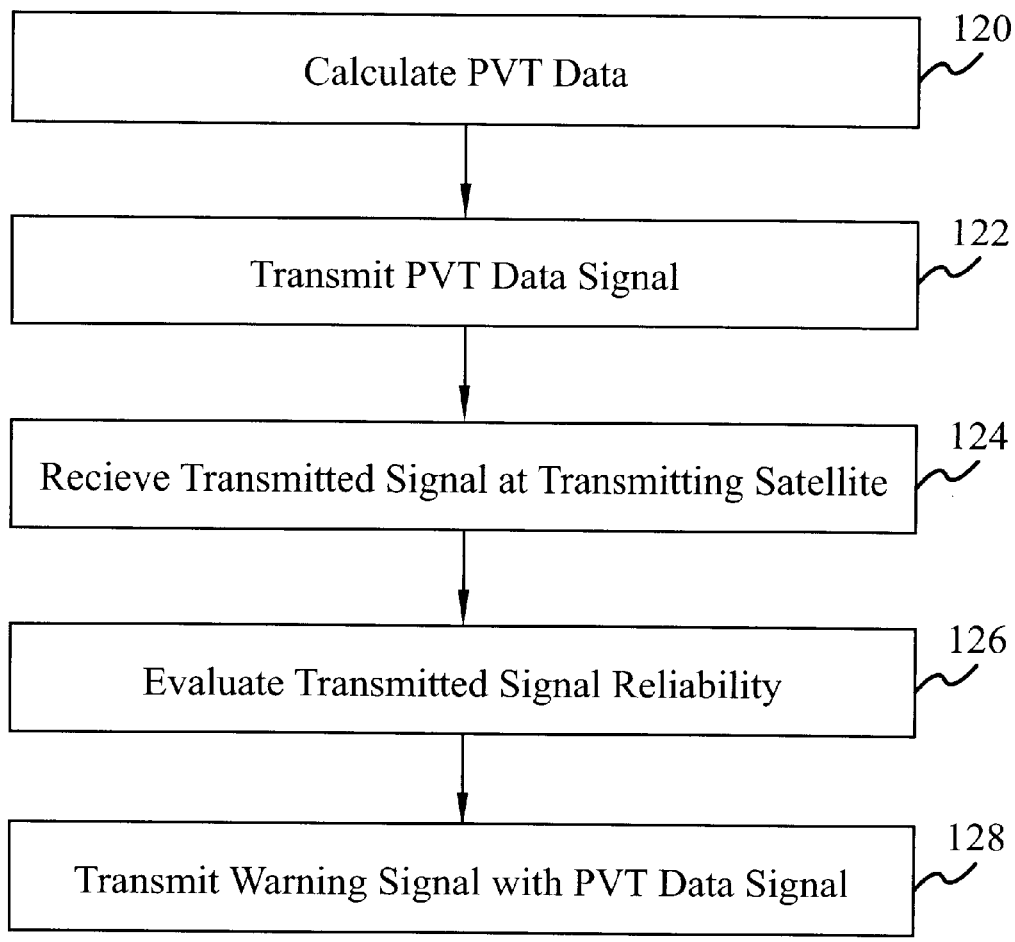
FIG. 7 is a flow-chart diagram illustrating a method of transmitting a GPS satellite signal according to an embodiment of the present invention.

With reference to FIG. 7, a description of a method of transmitting PVT information from a satellite is shown. First, the PVT data for the satellite may be calculated (step 120). This calculation may involve any method of calculating PVT information, including the use of ranging and time calculations through cross-links with neighboring satellites. Such calculations are well known to those of ordinary skill in the art and may readily be adapted for use with embodiments of the present invention. Once the PVT data for the satellite is calculated, it is converted to a transmittable satellite signal and transmitted at two or more different frequencies (step 122). Conversion of the PVT data to a transmittable satellite signal may involve modulating the PVT data with one or more codes such as bi-phase key shifting or pseudo-random noise and modulating with one or more carrier frequencies. The transmitted signal is then received by a receiver mounted on the transmitting satellite (step 124). By receiving the transmitted signal just as it is transmitted, the exact nature of the transmitted signal may be more completely evaluated. The received signal is monitored to evaluate the reliability of the transmitted signal (step 126). Reliability may be evaluated using any number of signal reliability tests known in the art or described previously herein. If any portion of the received signal is deemed unreliable, an appropriate warning signal is transmitted simultaneous with the PVT signal to indicate the unreliability of the PVT signal as it leaves the satellite (step 128). The warning signal may include an indication of general unreliability or may be specifically tailored to detail the precise nature and extent of the unreliability.

Figure 8:
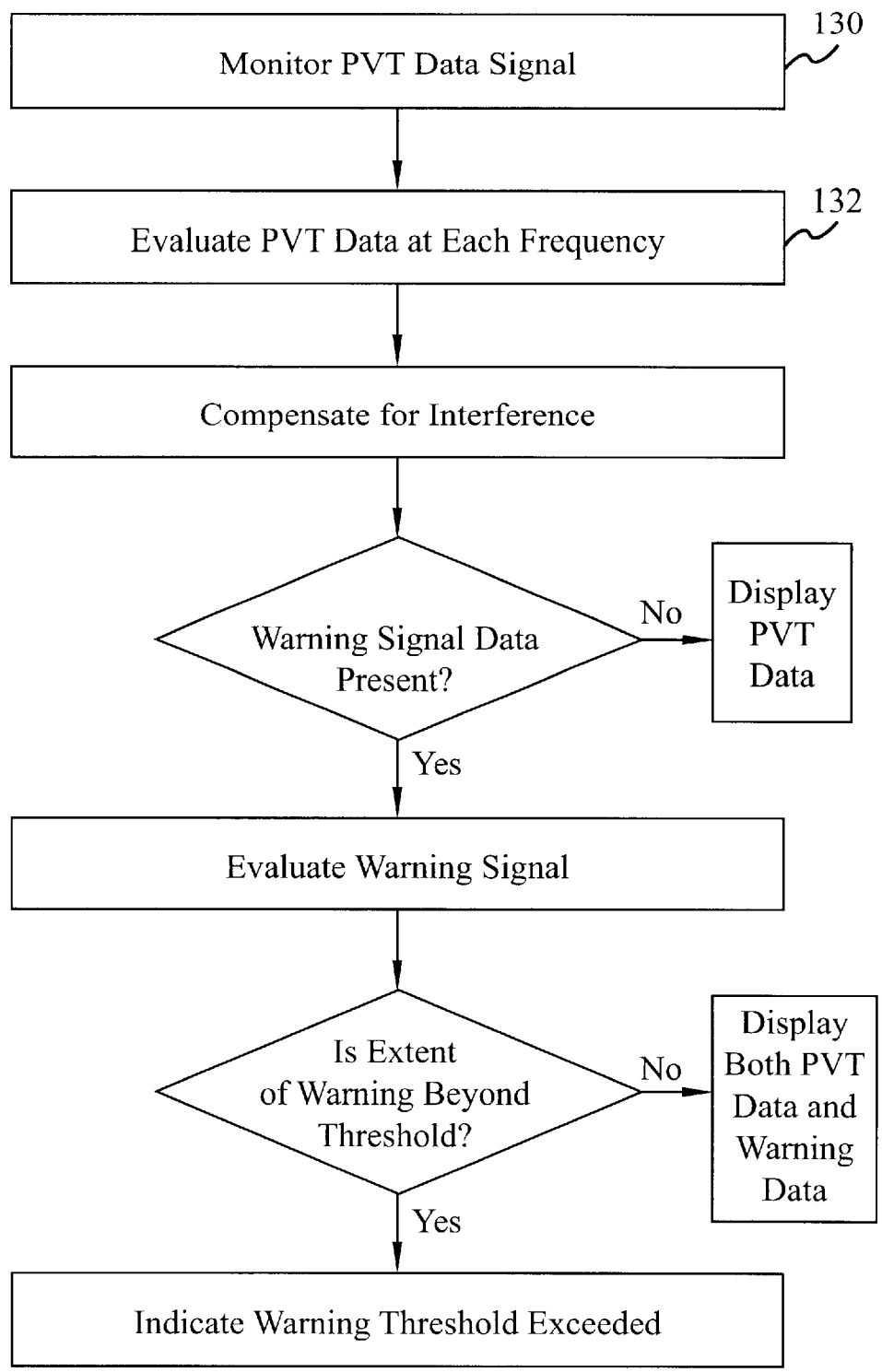
FIG. 8 is a flow chart diagram illustrating a method of receiving a GPS satellite signal according to an embodiment of the present invention.

As shown in FIG. 8, a receiver receiving the transmitted signal monitors the satellite signal using a receiver configured to monitor the PVT data within the signal (step 130). The receiver makes an independent evaluation of the PVT data of each of at least two satellite signal frequencies (step 132) and compensates for any effects of interference or the ionosphere between the satellite which transmitted the signal and the receiver (step 134). Next, in certain embodiments of the present invention, the receiver determines whether a warning signal is present in the received satellite signal (136). If a warning signal is not present, the receiver may then calculate the PVT information for the receiver derived from a plurality of satellite signals received and display it (step 138). If warning signal data is present, the receiver may then evaluate the warning signal alone or in association with other satellite signals received (step 140), and determine whether the extent of the warning signal data is beyond a reliability threshold for the satellite's or receiver's use (step 142). In this way, a user of a receiver may select an acceptable reliability threshold for the particular application of the receiver. If the reliability threshold for the receiver has been exceeded, the receiver may merely display an indication that the reliability threshold has been exceeded (step 144). If the reliability threshold for the receiver has not been exceeded, the receiver may display both the PVT information for the receiver and all or a portion of the warning signal data on an associated receiver display. Note that it may be possible for the receiver to exclude a satellite with a warning signal and derive PVT information meeting the user's reliability threshold from at least four other satellites in view that do not have warning signals.

Thus, by placing a receiver on a satellite to monitor the signals transmitted from the satellite, transmitting warning signals substantially simultaneous with satellite signals where unreliability is indicated, and transmitting signals at two or more frequencies simultaneously, the reliability and availability of a satellite signal is improved, and the inaccuracy of the individual satellite signal may be bounded.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, it will be clear to those of ordinary skill in the art that while the specific examples provided herein relate to GPS satellite systems, the various aspects of the present invention are applicable to all satellite systems and may be readily applied to those systems from the teachings provided herein.

What is claimed is:

1. A self-monitoring satellite comprising:
    a transmitter mounted on the satellite;
    a receiver mounted on the satellite and configured to receive a signal transmitted from the satellite; and
    a processor associated with the receiver and configured to interpret the received signal to determine position information, velocity information and time information included in the received signal, and to monitor the reliability of the determined information.

2. The self-monitoring satellite of claim 1, wherein the processor is configured to monitor at least one of pseudo-random code distortion, clock drift, signal power level, code-carrier divergence, data parity, code structure, clock rate, clock acceleration, signal deformation, and broadcast ephemeris and clock navigation data.

3. The self-monitoring satellite of claim 1, wherein the satellite is configured as a GPS satellite.

4. The self-monitoring satellite of claim 1, wherein the processor is further configured to generate a warning signal if the information is unreliable.

5. The self-monitoring satellite of claim 1, wherein the transmitter is configured to transmit the signal from the satellite at each of at least two frequencies.

6. The self-monitoring satellite of claim 5, wherein the at least two frequencies include a frequency of approximately 1575.42 MHz, a frequency of approximately 1227.60 MHz, and a frequency of approximately 1176 MHz.

7. The self-monitoring satellite of claim 4, wherein the transmitter is configured to transmit the warning signal at a frequency equal to a frequency of a transmitted signal to which the warning signal pertains.

8. A method of monitoring the reliability of a signal transmitted from a satellite, the method comprising:
    receiving the signal on the satellite from which the signal was transmitted, the transmitted signal including position information, velocity information and time information; and
    monitoring the information included in the received signal on the satellite for reliability.

9. The method of claim 8, wherein monitoring the information comprises monitoring at least one of pseudo-random code distortion, clock drift, signal power level, code-carrier divergence, data parity, code structure, clock rate, clock acceleration, signal deformation, and broadcast ephemeris and clock navigation data.

10. The method of claim 8, further comprising generating a warning signal regarding reliability of monitored information.

11. The method of claim 10, further comprising transmitting the warning signal substantially simultaneous with the satellite signal to which the warning data applies.

12. The method of claim 11, wherein transmitting the warning signal substantially simultaneous with the satellite signal comprises transmitting the warning signal less than 2 seconds after the satellite signal to which the warning signal applies is transmitted.

13. The method of claim 10, further comprising transmitting the warning signal at a frequency equal to a frequency at which the satellite signal to which the warning signal pertains was transmitted.

14. A method of warning a satellite signal user of an unreliable signal, the method comprising:
    transmitting a satellite signal including satellite data to a receiver;
    evaluating a characteristic of the transmitted satellite signal for reliability at the satellite;
    transmitting a warning signal to the receiver, the warning signal including warning data relating to the reliability of the evaluated characteristic of the satellite signal;
    receiving both the warning signal and the satellite signal at the receiver; and
    determining whether to rely upon the satellite signal in response to the warning signal.

15. The method of claim 14, wherein evaluating the signal characteristic comprises evaluating at least one of pseudo-random code distortion, clock drift, signal power level, code-carrier divergence, data parity, code structure, clock rate, clock acceleration, signal deformation and broadcast ephemeris and clock navigation data.

16. The method of claim 14, further comprising transmitting the warning signal to the receiver substantially simultaneous with the satellite signal to which the warning signal applies.

17. The method of claim 16, wherein transmitting the warning signal substantially simultaneous with the satellite signal comprises transmitting the warning signal less than 2 seconds after the satellite signal to which the warning signal applies is transmitted.

18. The method of claim 16, further comprising transmitting the warning signal at a frequency equal to a frequency at which the satellite signal to which the warning signal pertains was transmitted.

19. The method of claim 14, wherein transmitting the satellite signal including satellite data comprises transmitting the satellite data on each of at least two different carrier frequencies.

20. A satellite signal system comprising a processor configured to determine the reliability of a satellite signal, generate a reliability indicator in response to the reliability determination at the satellite, and substantially simultaneously transmit the satellite signal and the reliability indicator to a receiver.

21. The satellite signal system of claim 20, wherein the satellite signal and the reliability indicator are substantially simultaneously transmitted from a satellite on which the satellite signal originated.

22. The satellite signal system of claim 20, wherein the satellite signal is relayed to the receiver by a ground based augmentation system substantially simultaneously with the ground based augmentation system transmitting the reliability indicator to the receiver.

23. The satellite signal system of claim 20, wherein the processor is further configured to transmit the satellite signal at each of at least two different frequencies.

24. The satellite signal system of claim 23, wherein the receiver is configured to receive the satellite signal at each of the two or more frequencies, evaluate each of the received frequencies separately, and compensate for any signal interference between the processor and the receiver.

25. A GPS satellite system comprising:
   a plurality of satellites each transmitting a GPS satellite signal;
   a first GPS satellite among the plurality of satellites transmitting a GPS satellite signal, the first GPS satellite comprising:
      a first satellite receiver configured to monitor the GPS satellite signal transmitted from the first satellite; and
      a processor associated with the receiver and configured to evaluate a characteristic of the monitored GPS satellite signal transmitted from the satellite and to transmit a warning signal approximately simultaneous with the transmitted GPS satellite signal if the GPS satellite signal is deemed unreliable; and
   a receiver on earth configured to receive one or more transmitted GPS satellite signals and determine therefrom at least one of a position, a velocity and a time reference for the ground receiver.

26. The GPS satellite system of claim 25, the first satellite further comprising a transmitter configured to transmit each GPS satellite signal at each of two or more different frequencies.

27. The GPS satellite system of claim 26, wherein the frequencies comprise a frequency of approximately 1575.42 MHz, a frequency of approximately 1227.60 MHz, and a frequency of approximately 1176 MHz.

28. The GPS satellite system of claim 26, wherein the receiver on earth is configured to evaluate each of the two or more different frequencies separately and compensate for signal interference and ionospheric delay between the first GPS satellite and the receiver on earth in response to the evaluation of the different frequencies.

29. The GPS satellite system of claim 25, wherein the processor of the first GPS satellite is further configured to generate a warning signal if the monitored characteristic makes the GPS satellite signal transmitted from the first GPS satellite unreliable.

30. The GPS satellite system of claim 29, wherein the warning signal comprises warning data including information regarding at least one of which characteristic of the signal is unreliable, how long the signal has been unreliable, and to what extent the characteristic or signal is unreliable.

31. The GPS satellite system of claim 29, wherein the warning signal is transmitted substantially simultaneous with the satellite signal to which the warning signal corresponds.

32. The GPS satellite system of claim 31, wherein the warning signal is transmitted less than 2 seconds after the satellite signal to which the warning signal corresponds.

33. The GPS satellite system of claim 31, wherein the warning signal is transmitted at a frequency equal to a frequency at which the satellite signal to which the warning signal pertains was transmitted.

34. A method of bounding the inaccuracy of a GPS satellite signal at a receiver, the method comprising:
   receiving a transmitted GPS satellite signal at a satellite from which the signal was transmitted;
   monitoring at least one characteristic of the received signal for reliability; and
   transmitting a warning signal approximately simultaneous with the transmitted GPS satellite signal if the signal is deemed unreliable.

35. The method of claim 34, wherein monitoring the characteristic comprises monitoring at least one of pseudorandom code distortion, clock drift, signal power level, code carrier divergence, data parity, code structure, clock rate, clock acceleration, signal deformation and broadcast ephemeris and navigation data.

36. The method of claim 34, further comprising transmitting the warning signal substantially simultaneous with satellite signal to which the warning signal applies.

37. The method of claim 36, wherein transmitting the warning signal substantially simultaneous with the satellite signal comprises transmitting the warning signal less than 2 seconds after the satellite signal to which the warning signal applies is transmitted.

* * * * *